United States Patent
Bösmann et al.

(10) Patent No.: US 10,322,391 B2
(45) Date of Patent: Jun. 18, 2019

(54) REACTOR DEVICE FOR THE RELEASE OF A GAS FROM A STARTING MATERIAL

(71) Applicant: HYDROGENIOUS TECHNOLOGIES GmbH, Erlangen (DE)

(72) Inventors: Andreas Bösmann, Hessdorf (DE); Patrick Preuster, Heideck (DE); Eberhard Schlücker, Obersulm (DE); Nicolas Alt, Schwabach (DE); Patrick Inhetveen, Pattensen/Hüpede (DE); Annemarie Breu, Leupoldsgrün (DE); Matthias Kusche, Schwaig (DE); Oliver Weisert, Neunkirchen am Brand (DE)

(73) Assignee: HYDROGENIOUS TECHNOLOGIES GmbH, Erlangen (DE)

( * ) Notice: Subject to any disclaimer, the term of this patent is extended or adjusted under 35 U.S.C. 154(b) by 0 days.

(21) Appl. No.: 15/570,092

(22) PCT Filed: Mar. 21, 2016

(86) PCT No.: PCT/EP2016/056153
§ 371 (c)(1),
(2) Date: Oct. 27, 2017

(87) PCT Pub. No.: WO2016/173775
PCT Pub. Date: Nov. 3, 2016

(65) Prior Publication Data
US 2018/0141017 A1 May 24, 2018

(30) Foreign Application Priority Data

Apr. 30, 2015 (DE) .................. 10 2015 208 009

(51) Int. Cl.
*B01J 7/02* (2006.01)
*B01J 8/02* (2006.01)
(Continued)

(52) U.S. Cl.
CPC ............... *B01J 8/0285* (2013.01); *B01J 7/02* (2013.01); *B01J 8/0214* (2013.01); *B01J 8/0278* (2013.01);
(Continued)

(58) Field of Classification Search
CPC .... B01J 8/00; B01J 8/02–0214; B01J 8/0278; B01J 8/0285; B01J 19/00; B01J 19/24;
(Continued)

(56) References Cited

U.S. PATENT DOCUMENTS

2004/0191137 A1  9/2004 Chellappa
2006/0165568 A1  7/2006 Yoshizaki
(Continued)

FOREIGN PATENT DOCUMENTS

DE  102008034221 A1 *  1/2010  ............. F02M 25/12
FR  2 927 323 A3  8/2009
(Continued)

*Primary Examiner* — Natasha E Young
(74) *Attorney, Agent, or Firm* — McGlew and Tuttle, P.C.

(57) ABSTRACT

A reactor device for the release of a gas from a starting material includes a reactor housing having a longitudinal axis and at least one single reactor arranged in the reactor housing, the single reactor including a base plate oriented transversely to the longitudinal axis, a starting material flow channel defining a starting material flow direction, a catalyst arranged in the starting material flow channel, a heating unit for heating the catalyst and/or the starting material and a gas collection chamber arranged above the starting material flow channel for collecting the gas released from the starting material.

20 Claims, 3 Drawing Sheets

(51) Int. Cl.
    *B01J 19/24*    (2006.01)
    *C01B 3/02*     (2006.01)
    *C01B 3/22*     (2006.01)

(52) U.S. Cl.
    CPC ............... *B01J 19/249* (2013.01); *C01B 3/22* (2013.01); *B01J 2208/00141* (2013.01); *B01J 2208/00893* (2013.01); *B01J 2219/185* (2013.01); *B01J 2219/192* (2013.01); *B01J 2219/1923* (2013.01); *B01J 2219/1925* (2013.01); *B01J 2219/1943* (2013.01); *B01J 2219/2453* (2013.01); *B01J 2219/2458* (2013.01); *B01J 2219/2462* (2013.01); *B01J 2219/2467* (2013.01); *B01J 2219/2481* (2013.01); *B01J 2219/2495* (2013.01); *B01J 2219/2496* (2013.01); *C01B 2203/0277* (2013.01)

(58) Field of Classification Search
    CPC ............... B01J 19/248; B01J 19/249; B01J 2208/00–00017; B01J 2208/00106; B01J 2208/00115; B01J 2208/00141; B01J 2208/00796; B01J 2208/00893; B01J 2219/18; B01J 2219/185; B01J 2219/19; B01J 2219/192; B01J 2219/1923; B01J 2219/1925; B01J 2219/194; B01J 2219/1941; B01J 2219/1943; B01J 2219/24; B01J 2219/2401; B01J 2219/245–2453; B01J 2219/2456; B01J 2219/2458; B01J 2219/2461; B01J 2219/2462; B01J 2219/2467; B01J 2219/2481; B01J 2219/2491–2496; C01B 3/00; C01B 3/02; C01B 3/22; C01B 2203/00; C01B 2203/02; C01B 2203/0266; C01B 2203/0277
    See application file for complete search history.

(56) References Cited

U.S. PATENT DOCUMENTS

2007/0100094 A1    5/2007  Yount et al.
2010/0233047 A1*   9/2010  Olbert .................. B01F 5/0451
                                                          422/621

FOREIGN PATENT DOCUMENTS

JP       2004-250256 A    9/2004
WO       2009/056488 A1   5/2009
WO       2014/044706 A1   3/2014

* cited by examiner

REACTOR DEVICE FOR THE RELEASE OF A GAS FROM A STARTING MATERIAL

CROSS REFERENCE TO RELATED APPLICATIONS

This application is a United States National Phase application of International Application PCT/EP2016/056153, now WO 2016/173775, filed Mar. 21, 2016 and claims the benefit of priority under 35 U.S.C. § 119 of German Patent Application DE 10 2015 208 009.9 filed Apr. 30, 2015, the entire contents of which are incorporated herein by reference.

FIELD OF THE INVENTION

The invention concerns a reactor device for the release of a gas from a starting material.

BACKGROUND OF THE INVENTION

WO 2014/044 706 discloses a reactor for the release of hydrogen gas, in other words for dehydrogenation, from a liquid hydrogen carrier medium serving as starting material. The flow of the starting material in the reactor, in particular when flowing through a catalyst packing, results in a pressure loss and flow dead zones. The flow of the starting material in the reactor is hardly influenceable. A heating of the catalyst is possible only from below. The heat input into the reaction medium, i.e. the starting material, is impaired. The reaction volume is reduced. The catalyst is ineffective.

SUMMARY OF THE INVENTION

The invention is based on the object of providing a reactor device that allows a gas to be released from a starting material in economically efficient manner.

This object is achieved by a reactor device for the release of a gas from a starting material, the reactor device comprising a reactor housing having a longitudinal axis, at least one single reactor arranged in the reactor housing, the single reactor comprising a base plate oriented transversely to the longitudinal axis, a starting material flow channel defining a starting material flow direction, a catalyst arranged in the starting material flow channel, a heating unit for heating the catalyst and/or the starting material, a gas collection chamber arranged above the starting material flow channel for collecting the gas released from the starting material. The gist of the invention is that a reactor device has at least one single reactor arranged in a reactor housing, the reactor having an open geometry. The open geometry is obtained in such a way that a starting material flow channel in which a catalyst is arranged, is connected to a gas collection chamber arranged above the starting material flow channel for collecting the gas released from the starting material. Gas, in particular hydrogen, released from the starting material, in particular a liquid organic hydrogen carrier (LOHC) or another hydrated material, which is in particular present in a liquid state, is able to flow from the starting material flow channel into the gas collection chamber automatically so as to be collected there. The collected gas may then be discharged from the single reactor into the reactor housing and out of the reactor device. The reactor housing is in particular a pressure vessel that has a constant geometry, in particular a constant cross-sectional area, in particular along a longitudinal axis. A base plate of the single reactor is oriented transversely, and in particular perpendicularly to the longitudinal axis. The starting material flow channel is configured for a starting material to flow therethrough and extends in particular along the base plate. The starting material flow channel defines a starting material flow direction. The flow of the starting material is channeled. Despite the open geometry of the reactor device, the liquid starting material follows a defined flow direction. It is possible to guarantee high dwell times for the starting material in the reactor device, in particular in the single reactor. The high dwell time of the starting material in the single reactor results in an increased reaction rate of the reactor device. The amount of gas released from the starting material is increased. The starting material flow direction is arranged in particular in a starting material flow plane that is parallel to the base plate. A catalyst is provided in the starting material flow channel. The catalyst facilitates the release of the gas from the starting material. The starting material is in direct contact with the catalyst. A heating unit is provided to heat the catalyst and/or the starting material in particular directly. The reactor device according to the invention ensures an improved heat transfer from the heating unit into the catalyst and/or the starting material. In particular, the reactor device according to the invention ensures an increased ratio of the surface area of the heating unit to the volume of the starting material and/or catalyst. The heat input of the heating unit into the catalyst and/or into the starting material is increased. For a rectangular flow channel with a channel width of approximately 2 cm and a channel length of approximately 1 m, the ratio of surface area to volume is approximately 150 $m^{-1}$.

The open geometry of the reactor device and in particular of the single reactor simplifies, and therefore facilitates, the release of the hydrogen. The reaction, which allows a disproportionate gas volume to be obtained from a reduced volume of the liquid starting material, can thus be carried out in an economically reasonable manner. In particular, it is conceivable to discharge the gas volume, which is obtainable theoretically, in a targeted manner and to use said gas volume for another purpose, in particular an exploitation, in particular in a fuel cell. The gas volume is up to 700 times greater than the volume of the liquid starting material. Due to the open geometry of the reactor device and in particular the single reactor, the released gas is able to flow from the starting material flow channel into the gas collection chamber directly and in particular automatically. It is in particular not necessary to convey the released gas along the starting material flow channel together with the starting material. In particular, this prevents the reaction gas from escaping at the end of the starting material flow channel at a high speed. Furthermore, the discharge of the carrier material, in particular of the LOHC, is reduced. A blocking of the catalyst by gas is thus avoided. The handling and the operation of the reactor device are simplified. The risk of accidents and in particular the risk of damages to the reactor are reduced. The reactor device in particular has a modular design. This means that more than one single reactor can be arranged in the reactor device as well. The modular design allows a single reactor to be flexibly mounted and demounted in the reactor housing, in particular at a reduced mounting effort. Changing the number of the single reactors in the reactor device is uncomplicated. The reactor device can easily be adapted to a desired or required operating volume of the gas to be released by changing the number of the single reactors. The single reactors can be arranged along the longitudinal axis in such a way that the respective base plates are arranged parallel to each other at a distance from one another. Each single reactor permits a precise, in particular definable reaction volume, in other words a predetermined gas volume to be obtained from the starting material. By increasing the number of the single reactors, the total gas volume obtainable from the starting material is increased immediately. In particular, the modular design of the reactor device allows the reaction volume of the reactor device to be adapted individually for an upcoming reaction by changing the number of the single reactors directly.

The single reactor is particularly easy to produce. In particular, the starting material flow channel is defined by baffles and/or heat transfer pipes. The starting material flow channel is laterally bounded by boundary members along the starting material flow direction. Boundary members may for instance be baffles and/or heat transfer pipes and/or the reactor housing itself, in particular a side wall of the reactor housing. The baffles and/or heat transfer pipes can be bent in advance. The production effort is reduced.

The heating unit in particular allows the catalyst, in other words the catalyst material, to be heated directly. In particular, it is conceivable to arrange the catalyst in the form of a loose bulk of catalyst particles along the starting material flow channel. The height of the bulk corresponds in particular to the height of the boundary members, in particular the heat transfer pipes and/or the baffles. The baffles can in particular be heated directly. The heat transfer from the heating unit into the catalyst is thus improved.

The reactor device, in particular the parts of the reactor housing, that are in direct contact with the catalyst material or are at least arranged near the catalyst, in other words near the reaction, may be made of metal, in particular of copper or brass. In particular, the parts of the reactor housing on which the catalyst material is arranged in the form of a loose bulk, in other words a bottom wall and/or the boundary members, for example, are made of a well-conductive material. Surprisingly it was found that the reaction condition for the endothermic reaction in the reactor are improved by these materials due to the high heat conductivity thereof. In particular, the transport of heat into the endothermic reaction is improved. In particular, the base plate and/or the starting material flow channel as well as the members defining the starting material flow channel such as baffles and/or heat transfer members, can be made of these materials.

A reactor device in which the starting material flow channel is directly connected to the gas collection chamber along a first length facilitates the escape of the gas from the starting material. In particular, the first length is at least half, in particular at least 60%, in particular at least 80%, in particular at least 90%, in particular at least 95%, and in particular at most 100% of a total length of the starting material flow channel. This ensures that the gas released is able to escape into the gas collection chamber arranged thereabove freely and automatically across a large part of the length of the starting material flow channel, and in particular along the total length of the starting material flow channel. A reactivity of the reactor device is increased in particular when compared to prior art reactor devices having a closed, pipe-shaped geometry in which the released gas, in particular hydrogen, can be transported and discharged only in the flow direction.

In a reactor device in which the gas collection chamber has a gas collection chamber volume greater than the volume of the starting material flow channel, the release of the gas from the starting material is not impaired. The gas volume released, which is up to 700 times greater than the volume of the liquid starting material, is not limited in space. This allows the gas released, in particular hydrogen gas, to develop in an unimpeded manner, so as to escape in particular freely from the starting material flow channel. The gas collection chamber volume is a multiple of the starting material flow channel volume, said multiple being greater than 1. The gas collection chamber volume is in particular more than 150% of the volume of the starting material flow channel, in particular at least 200%, in particular at least 300%, in particular at least 400%, in particular at least 500%, in particular at least 750%, in particular at least 1000%, and in particular at most 10.000% of the volume of the starting material flow channel.

A reactor device in which a gas flow direction is oriented transversely and in particular perpendicularly to the starting material flow direction, allows the gas to be released from the starting material in an unimpeded manner. The gas flow direction is defined by the starting material flow channel as the gas source and the gas collection chamber as the gas target. The gas flow direction is oriented from the starting material flow channel towards the gas collection chamber.

A reactor device in which the starting material flow channel is configured such as to be open towards the gas collection chamber allows the released gas, in particular hydrogen gas, to escape automatically. In particular, it is not necessary to cover the starting material flow channel. The starting material flow channel has an uncomplicated design. The production of the starting material flow channel is simplified and therefore cost-effective. A reactor device having at least one gas discharge opening of the gas collection chamber serves to discharge the gas from the gas collection chamber in a targeted manner. The at least one gas discharge opening can in each case be connected to a respective suitable gas discharge line. The gas discharge lines allow the gas to be fed from the gas collection chamber to a subsequent use. In particular, a plurality of gas discharge lines can be provided. A flow cross-section provided by the at least one gas discharge opening for gas to be discharged allows the gas to be discharged at a sufficient flow rate. An excess pressure in the gas collection chamber caused by an obstruction is prevented. The at least one gas discharge opening is in particular configured such as to have a round cross-section. The gas discharge opening may also have a different cross-section. A gas discharge line arranged at the gas discharge opening is provided to allow the gas released, in particular hydrogen, to escape from the pressure vessel in particular without requiring a convection effect. The gas discharge line is in particular arranged in a lower region of the pressure vessel, in other words in a bottom region of the pressure vessel. In other words, it is generally conceivable for the gas discharge lines to be provided in the pressure vessel in a different configuration.

A reactor device in which the catalyst is provided in the form of a loose bulk of catalyst particles allows the single reactor to be equipped with the catalyst in an uncomplicated and flexible manner. It is conceivable, for example, to change the catalyst depending on the reaction to be carried out, by removing the loose bulk of a first catalyst from the base plate and arranging a loose bulk of a second catalyst on the base plate. The catalyst particles are in particular provided in the form of pellets, in other words as individual particles. The average diameter is in a range of 0.01 mm to 20 mm, in particular of 0.05 mm to 10 mm, in particular of 0.1 mm to 8 mm, in particular of 0.5 mm to 5 mm, and in particular of 1 mm to 3 mm. The catalyst particles are arranged on the base plate and in particular in the open starting material flow channel through which the starting material flows. The catalysts used, in particular for the dehydrogenation of LOHC, are in particular mixtures of at least one metal or a metal oxide with a carrier material, in particular noble metals, and an inorganic carrier material. A mixture may for instance be platinum with aluminum oxide and platinum with carbon or other metals such as nickel, palladium, rhodium, gold, iridium, osmium, rhenium, copper and/or iron.

A reactor device in which the heating unit has at least one heat carrier flow channel through which a heat carrier medium flows ensures a comparatively high dwell time of the heat carrier medium in the single reactor at a constant flow speed. The ratio of the surface of the heating unit to the volume of the starting material and/or the catalyst is increased even more. A heat carrier medium provides a cost advantage over an electric heating. Besides, the integration of an electric heating into an already existing heating networks is complicated. The heating unit comprising a heat carrier medium can be linked to an already existing heating network in an uncomplicated manner. Furthermore, it is conceivable to use waste heat of the heat carrier medium for other processes. The heat carrier flow channel has a piping, which is to be made of closed pipes. It is conceivable to use semi-finished products from the field of steel construction. The pipes used for the heat carrier flow channel may have cross-sections of various shapes such as round, rectangular, polygonal, oval, star-shaped, wherein the outer face may have a certain minimum roughness and/or a coating. The coating may for instance be provided by a catalyst or a roughness former. The wall thickness of the pipes for the heat carrier flow channel shall be selected such as to be as low as possible. Depending on the stability requirements, the minimum wall thickness of the pipes may for example be at least 0.5 mm. It is conceivable as well for the minimum wall thickness to amount to 1.0 mm or more. The heat carrier flow channel is arranged in particular along the base plate and in particular at a distance from the base plate. The heat carrier flow channel is in particular rigidly connected to the base plate, for instance by means of a plurality of spot-shaped joints, in particular welding spots. The joints are at the same time spacers. The heat carrier flow channel is oriented in particular perpendicularly to the base plate and in particular transversely and/or parallel to the starting material flow channel. In particular, the heat carrier flow direction is opposite to the starting material flow direction. A heat transfer from the heat carrier medium to the starting material preferably takes place in a counter current process as it is particularly effective in terms of the heat transfer. Alternatively, it is conceivable for said heat transfer to be carried out in a co-current process or a cross-current process. Instead of as a pipe-shaped heat carrier flow channel, the heating unit may also be configured as a burner with a closed chamber arranged below the catalyst for direct heating. In principle, various heating possibilities are conceivable, which are known from other reactor device. What is essential is that the base plate of the single reactor is heated substantially homogeneously across the entire surface thereof. A reactor device comprising lateral baffle members defining the starting material flow channel simplifies a targeted configuration of the starting material flow channel. Lateral baffle members may for instance be formed by the heat carrier flow channel itself of by baffle members arranged on the base plate, in other words additional baffle members. However, it is conceivable as well to provide the base plate of the single reactor with a structure in such a way that the starting material flow channel is machined into the base plate by milling, for example. In this case, the starting material flow channel is produced in a metal cutting process. A structured surface permits an improved flexibility when defining the geometry of the starting material flow channel.

A reactor device in which the reactor housing and/or the single reactor are provided with a heat insulating layer has reduced heat losses. In particular, a heat insulation layer is arranged on an underside of the base plate facing away from the heating unit. The efficiency of the reactor device is improved.

A reactor device with a purification unit for separating carried-over and/or evaporated starting material in the released gas improves the quality, in particular the purity, of the reaction product. As a result of the reaction, it is hardly avoidable that starting material components remain in the released gas. By means of the purification unit, which is connectable in particular to the gas collection chamber, these unwanted starting material components are removed. In particular, these components are removed by means of a fabric material, in particular a fabric sleeve, through which the gas/starting material mixture flows, in particular when escaping from the gas collection chamber via the at least one gas discharge opening. The fabric sleeve serves as a droplet catcher for carried-over, dehydrogenated starting material, in particular dehydrogenated LOHC. The fabric sleeve is arranged in particular between base plates arranged one above the other and/or in the form of a filter at a gas discharge opening. The purification unit is in particular configured as a droplet catcher. The fabric may, for example, comprise woven fibers, oriented fibers, unoriented fibers pressed into a non-woven. The fabric can be made homogeneously of a textile or plastic material, or of various other materials.

Alternatively, the separation can also be carried out by condensation and/or adsorption.

A reactor device, in which the reactor housing has a substantially cylindrical design, permits a particularly compact and space-saving arrangement of a plurality of circular or annular base plates of single reactors along the longitudinal axis of the reactor housing. The single reactors are arranged at a distance from one another along the longitudinal axis. The distance along the longitudinal axis between two adjacent single reactors is in particular at least 10 mm.

A reactor apparatus in which the heating unit has a helical heat carrier flow channel permits an increased flow length for the heat carrier medium in the heating unit. The heat input from the heat carrier medium via the heat carrier flow channel to the starting material and/or catalyst in the starting material flow channel is improved. The heat carrier flow channel can be designed in the shape of an Archimedean spiral or a logarithmic spiral. In particular, the starting material flow channel is designed as an intermediate space between two adjacent helical windings of the heat carrier flow channel. This means that two adjacent helical windings serve as baffle members. The dwell time of the starting material in the starting material flow channel is increased. The flow length, and thus the dwell time, of the starting material in the single reactor is increased. As a result, the open geometry, i.e. the outflow area, from the starting material flow channel into the gas collection chamber is increased. The volume of the gas to be released is increased. In particular, the total length of the starting material flow channel is increased. The starting material flow channel is particularly simple and inexpensive.

A reactor device with a collection chamber of the single reactor enables a particularly effective supply and discharge of the heat carrier medium and/or the starting material. The collection chamber is in particular arranged centrally and in particular concentrically to the longitudinal axis of the reactor housing. The collection chamber simplifies the connection of two adjacent single reactors along the longitudinal axis. The collection chamber can have a collection chamber housing on which, in particular on collection chamber end faces, collection chamber connecting members can be arranged, which facilitates the modular connection of single reactors. For example, heat carrier medium and/or starting material lines arranged in the collection chamber can be connectable to one another more easily via standardized connection interfaces. In particular, a central supply and discharge of heat carrier medium and/or starting material is possible in an effective manner via the interconnected collection chambers of the single reactors.

The reactor device may also have a reactor housing which is substantially in the shape of a cuboid or a prism. The base plates of the single reactors are correspondingly polygonal, in particular rectangular. The base plates may also be triangular, pentagonal, hexagonal, or in any other shape.

A reactor device in which the starting material flow channel is fixed by planar guide members, which extend from the base plate in particular perpendicularly, permits an uncomplicated and targeted fixing of the starting material flow channel. In particular, the guide members used are in the form of baffles. The baffles can be flexibly and reliably connected to the base plate by welding, for example. It is also conceivable for the baffles to be fixed in a variable manner by means of a grid structure provided on the base plate. For this purpose, boreholes provided in a grid arrangement can be provided in the base plate. The boreholes are configured to receive retaining members used to clamp the baffles. It is also conceivable that retaining pins are formed integrally with a lower end face of the baffles, the retaining pins being inserted into the boreholes of the base plate. The starting material flow channel is in particular configured such as to meander along the rectangular base plate. The dwell time of the starting material in the single reactor, and thus the reactivity of the reactor apparatus as a whole, is increased in this manner.

A reactor device in which the base plate has a slope running from a starting material inlet opening to a starting material discharge opening and/or a starting material delivery pump ensures a reliable starting material flow through the single reactor. The risk of a starting material accumulation, which will reduce the reaction volume of the gas to be released, is reduced.

Both the features set out in the patent claims as well as the features set out in the subsequent exemplary embodiments of the device according to the invention are each suitable for themselves or in combination with one another to further develop the object according to the invention. The respective feature combinations do not constitute a limitation with respect to the further developments of the subject matter of the invention but are merely substantially illustrative.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
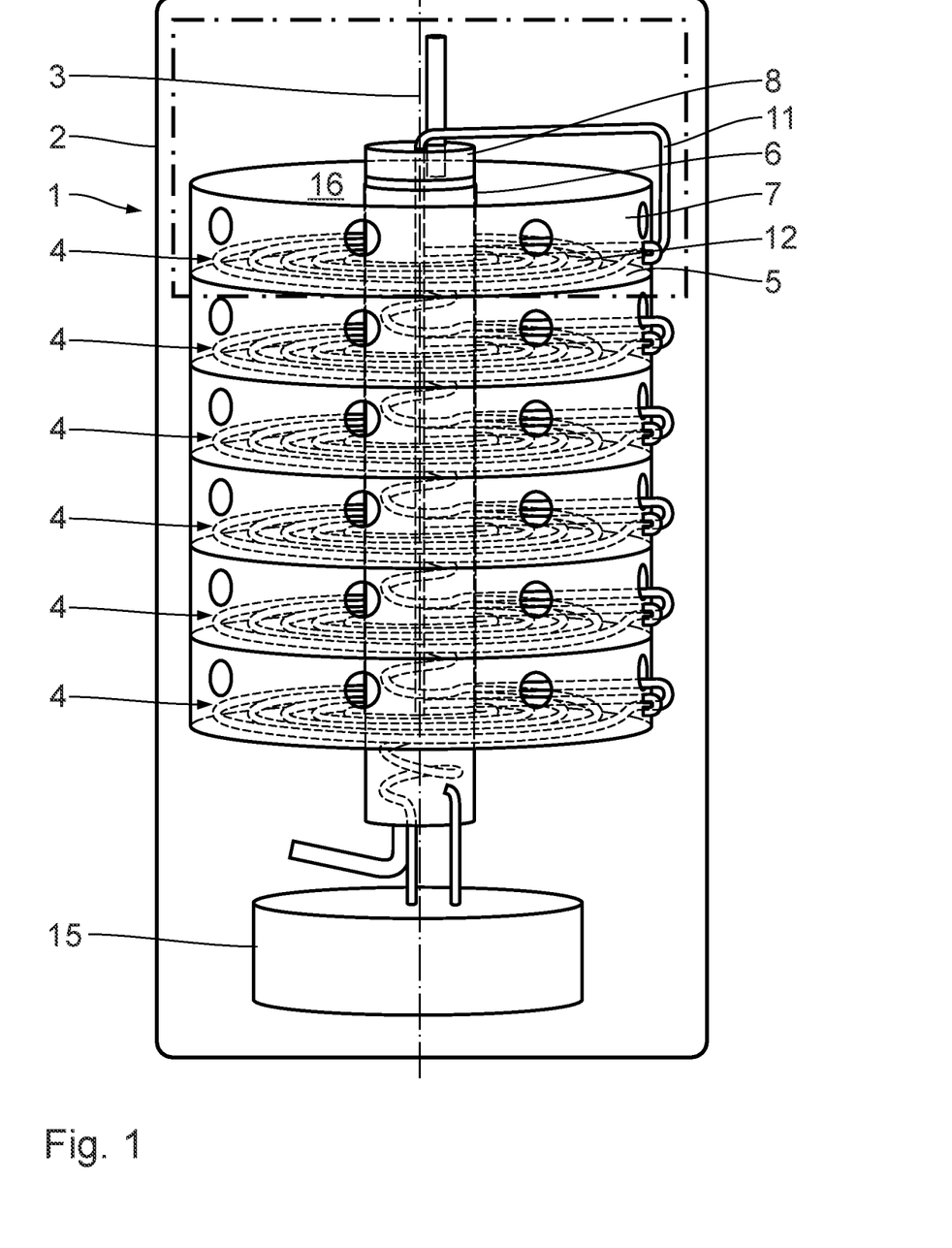
FIG. 1 is a sectional, schematic overall view of a reactor device according to a first exemplary embodiment.
Figure 2:
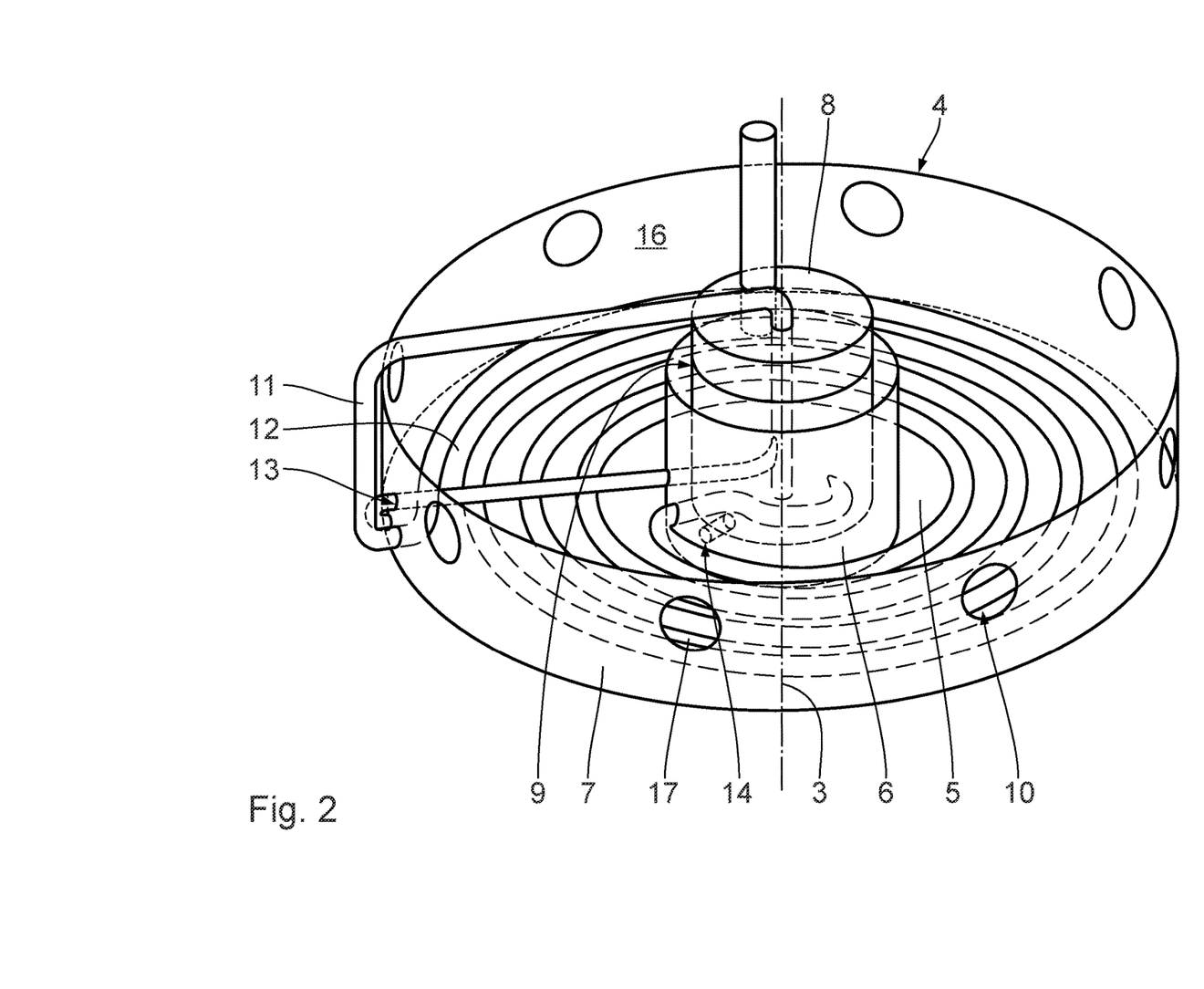
FIG. 2 is an enlarged perspective view of a single reactor of the reactor device in FIG. 1.

A reactor device 1 shown in FIGS. 1 and 2 serves to release hydrogen from liquid LOHC. The reactor device 1 is a dehydrogenator. The reactor device 1 is a plate dehydrogenator. In principle, the reactor device is suitable for the release of a gas from a starting material, which is in particular liquid.

The reactor device 1 has a reactor housing 2 illustrated schematically. The reactor housing 2 is substantially cylindrical and has a longitudinal axis 3. The reactor housing 2 is a pressure vessel.

According to the exemplary embodiment shown, six single reactors 4 are arranged in the reactor housing 2 along the longitudinal axis 3. The single reactors 4 are each designed identically. By increasing the number of single reactors 4, the performance of the reactor device 1, in particular the reaction volume thereof, can be increased. The single reactors 4 are connectable to each other along the longitudinal axis 3 substantially as often as required. The reactor device 1 has a modular design. Adding or removing single reactors 4 is uncomplicated and requires in particular only little assembly effort.

The single reactors 4 each have an annular base plate 5 with a central opening. The annular base plate 5 is delimited by an inner cylinder web 6 towards the longitudinal axis 3 and by an outer cylinder web 7 towards the reactor housing 2. A reaction chamber of the single reactor 4 is defined by the annular base plate 5, the inner cylinder web 6 and the outer cylinder web 7. The reaction chamber of the single reactor 4 is open at the top, in other words in a direction away from the base plate 5.

A collection chamber 8 is arranged inside the inner cylinder web 6. The collection chamber 8 is substantially cylindrical and serves to supply the single reactor 4 with a heat carrier medium, which is sold under the brand name Marlotherm SH by Sasol, for example, and a starting material, i.e. LOHC. The single reactors 4 are configured to be coupled to each other via the collection chamber 8. In particular, the four feed/discharge lines arranged in the collection chamber 8 are configured to be coupled to each other. It is possible to provide a central supply unit which supplies the collection chambers 8 of the single reactors 4 with starting material and heat carrier medium, the collection chambers 8 being connected to each other.

A heat carrier medium feed line 9 provided in the collection chamber 8 enters the reaction chamber from the inner cylinder web 6 at a position adjacent to the base plate 5. In the reaction chamber, a helical heat carrier flow channel 10 is formed by the heat carrier pipeline, the flow channel 10 extending outwardly from the inner cylinder web 6 in the shape of an Archimedean spiral. Two adjacent helical lines of the heat carrier flow channel 10 have an identical distance oriented radially relative to the longitudinal axis 3. The heat carrier flow channel 10 is arranged in a heat transfer plane, which is oriented parallel to the base plate 5. According to the exemplary embodiment shown, the helical configuration of the heat carrier flow channel 10 is designed in such a way that four complete revolutions around the longitudinal axis 3 of the heat carrier pipeline are provided. Adjacent to the base plate 5, the heat carrier pipeline is led out through the outer cylinder web 7 and back into to the collection chamber 8 by means of a heat carrier medium return line 11. Via the collection chamber 8, the heat carrier medium feed line 9 and the heat carrier medium return line 11 can be connected to an external heat carrier medium supply.

The heat carrier flow direction is therefore oriented helically from the inside to the outside along the heat carrier flow channel 10, in other words from the inner cylinder web 6 towards the outer cylinder web 7. Due to the helical arrangement of the heat carrier flow channel 10, intermediate spaces are obtained either between the inner cylinder web 6 and the heat carrier flow channel 10, between two adjacent windings of the heat carrier flow channel 10 or between the heat carrier flow channel 10 and the outer cylinder web 7. These intermediate spaces are also substantially helical. These intermediate spaces form a starting material flow channel 12. The supply of the starting material to the starting material flow channel 12 takes place via a starting material feed line 13 on the outer cylinder web 7. On the inner cylinder web 6, the starting material is discharged via the starting material discharge line 14 of the collection chamber 8. In other words, the starting material flows substantially from the outside to the inside relative to the longitudinal axis 3. The starting material flow direction is oriented counter to the heat carrier flow direction. The heat exchange takes place in a countercurrent process and is therefore particularly efficient. A central supply with starting material from a starting material storage 15, which can be arranged in the bottom region of the reactor housing 2 according to the exemplary embodiment shown, is possible by means of the starting material feed line 13 and the starting material discharge line 14.

It is conceivable as well for a central heating system to be arranged in the collection chamber 8. The heat carrier flow channel can then be omitted.

A catalyst in the form of a loose bulk of catalyst particles is provided in the starting material flow channel 12. Starting material flowing along the starting material flow channel 12 comes into direct contact with the catalyst.

In order to improve the flow of the heat carrier medium through the heat carrier flow channel 10 and, in particular, to ensure a continuous flow, a closed circuit line system can be provided along which a conveyor pump (not shown) is provided for conveying the heat carrier medium. Correspondingly, in order to facilitate the flow thereof, the starting material flow channel 12 can be configured such as to have a slope from the starting material feed line 13 towards the starting material discharge line 14. According to the exemplary embodiment of the single reactor 4 shown in FIG. 2, the base plate 5 could be configured such as to have a slope from the outer cylinder web 7 towards the inner cylinder web 6. In this case, the base plate is in the shape of a truncated cone.

The starting material flow channel 12 is open at the top. In particular, no upper cover is provided for the starting material flow channel 12. The starting material flow channel 12 is designed to be open at the top along its entire length and is therefore directly connected to a gas collection chamber 16 disposed thereabove. The gas collection chamber 16 is arranged inside the single reactor 4 and is bounded in the radial direction with respect to the longitudinal axis 3 by the inner cylinder web 6 and the outer cylinder web 7. In the outer cylinder web 7, a plurality of gas discharge openings 17, strictly speaking eight gas discharge openings 17 according to the exemplary embodiment shown, are provided in the outer cylinder web 7 to discharge the gas released from the starting material from the gas collection chamber in a targeted manner via the gas discharge openings 17 and gas discharge lines (not shown) connected thereto. In particular, the gas is discharged through an annular intermediate space between the single reactors 4 and the reactor housing 2 in the reactor device 1. The gas can be passed through a fabric sleeve configured as a droplet catcher in order to separate starting material from the gas, which was carried over inadvertently or has evaporated in the process.

The inner diameter of the pressure vessel is greater than the outer diameter of the base plate 5 or of the outer cylinder web 7. The radially outwardly extending pipelines, for example the heat carrier medium return line 11, the starting material feed line 13 and/or the gas discharge lines (not shown), have minimized contact surfaces to reduce heat losses to the outside, i.e. out of the single reactors 4.

The starting material feed line 13 can be connected via a starting material pump, which is in particular controlled centrally. In particular, it is possible in this manner to enable a pressure-controlled starting material supply to the base plates 5. The hydrated starting material can be fed to the base plate 5, on which optimal reaction conditions for a dehydrogenation prevail as a function of pressure and/or temperature, particularly in defined doses. For this purpose, pressure and/or temperature sensors are to be provided in each of the single reactors 4, which are in signal connection with a central control unit.

The operating principle of the reactor device according to the first exemplary embodiment is explained in more detail below. Starting material in the form of LOHC liquid is fed to the single reactors 4 of the reactor device 1 via the starting material feed line 13, in other words in the region of the outer cylinder web 7. The starting material flows along the starting material flow channel 12 towards the inner cylinder web 6 in a tapered helical configuration and is discharged there, in particular automatically, as a result of a slope in the starting material discharge line 14 of the collection chamber 8. The starting material flow is assisted additionally by a central pump device used to circulate the liquid starting material. Particulate catalyst material is provided along the starting material flow channel 12. A heated heat carrier medium is conveyed along the heat carrier medium fluid channel 10. The heat carrier medium delivers heat to the particulate catalyst material and to the starting material in the starting material flow channel 12. Due to the increased temperature and the contact of the starting material with the catalyst, hydrogen gas is released. The hydrogen gas can escape automatically into the gas collection chamber 16 of the single reactor 4 along the entire length of the upwardly open starting material flow channel 12. From the gas collection chamber 16, the hydrogen gas can be discharged through the gas discharge openings 17 and the gas discharge lines (not shown).

Due to the open geometry of the single reactor, the released gas thus obtained can be discharged at a high volumetric flow even at a high reaction rate without limiting the release reaction. The reactor device 1 has as simple and uncomplicated design and allows a particularly efficient execution of the separation process.

A second exemplary embodiment of the invention is described below with reference to FIG. 3. Parts designed identically are given the same reference numerals as in the first exemplary embodiment to the description of which reference is made. Parts having a different design but a similar function similar parts are given the same reference numerals followed by the letter a.

Figure 3:
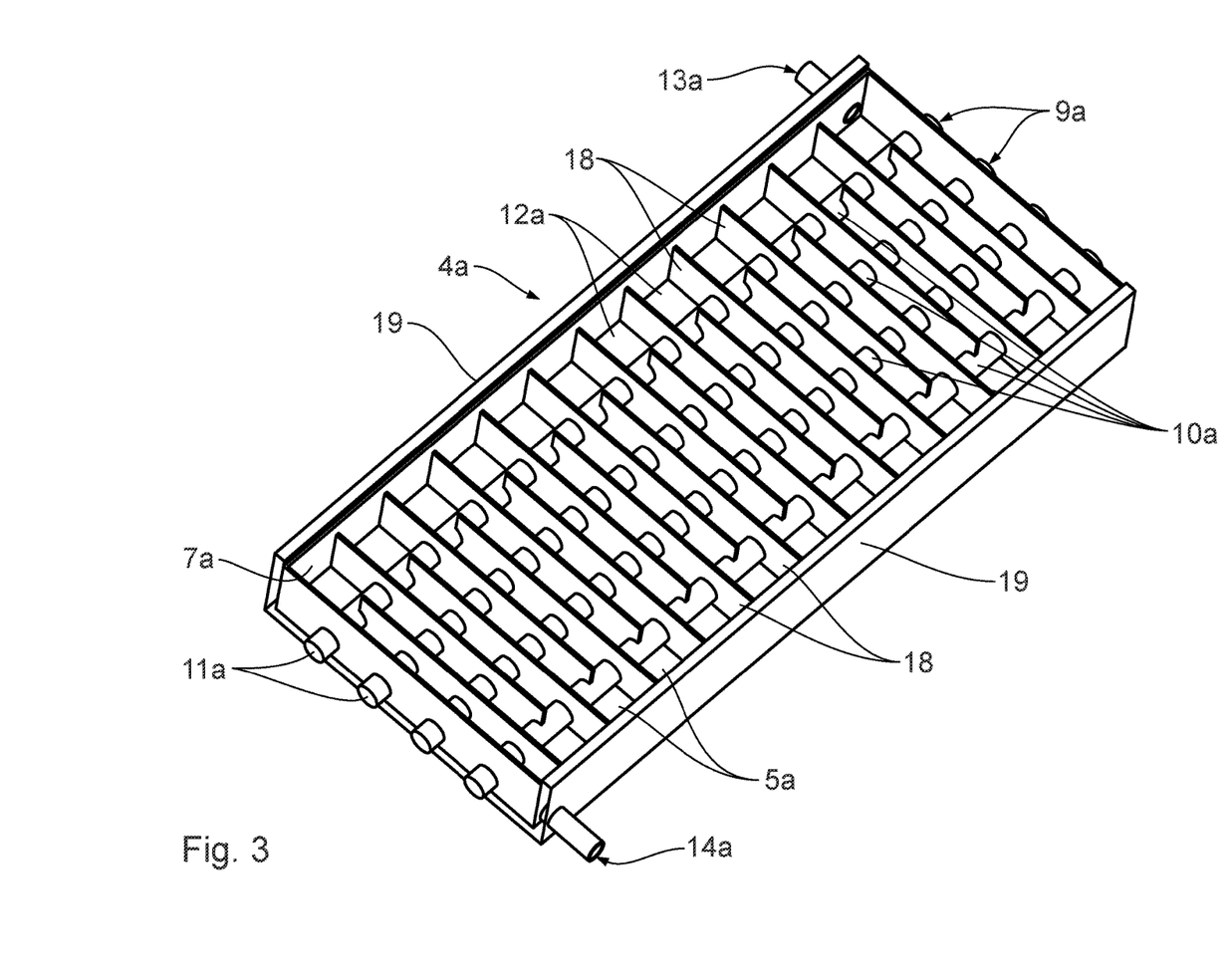
FIG. 3 is a view corresponding to FIG. 2 of a single reactor according to a second exemplary embodiment.

FIG. 3 shows a single reactor 4a the base plate 5a of which is rectangular. The single reactor 4a is correspondingly designed in the shape of a cuboid. In a corresponding reactor device (not shown), a plurality of single reactors 4a can be arranged one above the other along a longitudinal axis oriented in each case perpendicular to the base plates 5a. A peripheral boundary web 7a is provided on an outer periphery of the base plate 5a. Heat carrier medium feed openings 9a are provided on the respective shorter side walls of the rectangular boundary web 7a, and heat carrier medium return lines 11a are provided on the respective opposite side walls. According to the exemplary embodiment shown, four heat carrier flow channels 10a are guided through the single reactor 4a. The heat carrier flow channels 10a are each oriented parallel to one another and in particular parallel to the longer side edges of the rectangular boundary web 7a. It is conceivable as well to provide more or less than four heat carrier flow channels 10a. According to the exemplary embodiment shown, the heat carrier flow channels 10a are configured as hollow cylinder pipes. The pipelines may also have a different cross-section.

Lateral flow guide members in the form of baffles 18 are provided in the single reactor 4a. Each of the baffles 18 extends alternately from the longer side walls of the rectangular boundary 7a across approximately 80% of the width of the base plate 5a. In this way, a meander-shaped starting material flow channel 12a is defined. The starting material feed line 13a is provided on the upper right-hand side according to FIG. 3 while the starting material discharge line 14a is provided on the bottom left-hand side according to FIG. 3. This means that the main flow direction of the starting material substantially follows the width direction of the base plate 5a. The meandering flow is in particular perpendicular to the linear direction of flow through the heat carrier flow channels 10a. The catalyst particles are arranged in the starting material flow channel 12a. The fill level thereof does not exceed the height of the flow baffles 18. At the same time, the starting material should cover the catalyst pellets entirely. The meandering design of the starting material flow channel 12a ensures a comparatively high dwell time of the starting material in the single reactor 4a.

The starting material flow channel 12a is designed to be open at the top, allowing the gas released to escape in an upward direction automatically according to the first embodiment.

On the longer side edges of the outer webs a double sleeve 19 is provided for additional heating of the starting material and/or the catalyst. The base plate 5a can be provided with a double sleeve as well. According to the exemplary embodiment shown, the base plate 5a is arranged at an angle such that the starting material feed line 13a forms the highest point of the single reactor 4a while the starting material discharge line 14a forms the lowest point thereof. An automatic flow of the starting material along the starting material flow channel 12a is facilitated thereby. A forced flow by means of a pump can be considered as well.

While specific embodiments of the invention have been shown and described in detail to illustrate the application of the principles of the invention, it will be understood that the invention may be embodied otherwise without departing from such principles.

The invention claimed is:

1. A reactor device for the release of a gas from a starting material, the reactor device comprising:
   a reactor housing having a longitudinal axis;
   at least one single reactor arranged in the reactor housing, the at least one single reactor comprising a base plate oriented transversely to the longitudinal axis, a starting material flow channel defining a starting material flow direction, a catalyst arranged in the starting material flow channel, a heating unit for heating at least one of the catalyst and the starting material, a gas collection chamber arranged above the starting material flow channel for collecting the gas released from the starting material, the starting material flow direction being arranged in a starting material flow plane, the starting material flow plane being oriented parallel to the base plate.

2. A reactor device according to claim 1, wherein the starting material flow channel is directly connected to the gas collection chamber along a first length, wherein the first length is at least half of a total length of the starting material flow channel, at least a portion of the starting material flow channel extending about the longitudinal axis.

3. A reactor device according to claim 1, wherein a gas collection chamber volume is a multiple of a starting material flow channel volume.

4. A reactor device according to claim 1, wherein a gas flow direction to the starting material flow direction, the gas flow being oriented perpendicular to the starting material flow direction.

5. A reactor device according to claim 1, wherein the starting material flow channel is configured to be open towards the gas collection chamber.

6. A reactor device according to claim 1, further comprising at least one gas discharge opening of the gas collection chamber for a targeted discharge of the gas from the gas collection chamber.

7. A reactor device according to claim 1, wherein the catalyst is provided as a loose bulk of catalyst particles.

8. A reactor device according to claim 7, wherein the loose bulk of catalyst particles are provided as pellets, the pellets having an average diameter of 1 mm to 3 mm.

9. A reactor device according to claim 1, wherein the heating unit has at least one heat carrier flow channel through which a heat carrier medium flows, the at least one heat carrier flow channel being arranged in a heat transfer plane, the heat transfer plane being parallel to the base plate.

10. A reactor device according to claim 1, further comprising lateral flow guide members that define the starting material flow channel.

11. A reactor device according to claim 1, wherein at least one of the reactor housing and the at least one single reactor has a heat insulating layer.

12. A reactor device according to claim 1, wherein the reactor housing is substantially cylindrical, wherein the base plate is one of circular and annular.

13. A reactor device according to claim 12, wherein the heating unit has a helical heat carrier flow channel, wherein the starting material flow channel is defined by a free space between two adjacent helical windings serving as flow guide members.

14. A reactor device according to claim 13, wherein a collection chamber of the at least one single reactor is provided, said collection chamber being arranged centrally and concentrically relative to the longitudinal axis.

15. A reactor device according to claim 1, wherein the reactor housing is configured substantially in a shape of one of a cuboid and a prism, wherein the base plate is configured in a shape of a polygon.

16. A reactor device according to claim 15, wherein the starting material flow channel is defined by planar guide members.

17. A reactor device according to claim 16, wherein the base plate has a slope from a starting material feed opening towards a starting material discharge opening.

18. A reactor device according to claim 1, wherein the starting material flow channel is directly connected to the gas collection chamber along a first length, wherein the first length is greater than or equal to sixty percent of a total length of the starting material flow channel.

19. A reactor device for the release of a gas from a starting material, the reactor device comprising:
- a reactor housing having a longitudinal axis;
- at least one single reactor arranged in the reactor housing, the at least one single reactor comprising a base plate oriented transversely to the longitudinal axis, a starting material flow channel defining a starting material flow direction, a catalyst arranged in the starting material flow channel, a heating unit for heating at least one of the catalyst and the starting material, a gas collection chamber arranged above the starting material flow channel for collecting the gas released from the starting material;
- a purification unit for separating at least one of starting material carryover and evaporated starting material in the released gas, wherein the purification unit is connected to the gas collection chamber.

20. A reactor device for the release of a gas from a starting material, the reactor device comprising:
- a reactor housing having a longitudinal axis;
- at least one single reactor arranged in the reactor housing, the at least one single reactor comprising a base plate oriented transversely to the longitudinal axis, a starting material flow channel defining a starting material flow direction, a catalyst arranged in the starting material flow channel, a heating unit for heating at least one of the catalyst and the starting material, a gas collection chamber arranged above the starting material flow channel for collecting the gas released from the starting material, the heating unit having at least one heat carrier flow channel through which a heat carrier medium flows, wherein the at least one heat carrier flow channel is oriented in along the base plate.

* * * * *